May 28, 1963 E. LATTA 3,091,713
CERAMIC MAGNET MOUNTING STRUCTURE
Filed Sept. 24, 1959
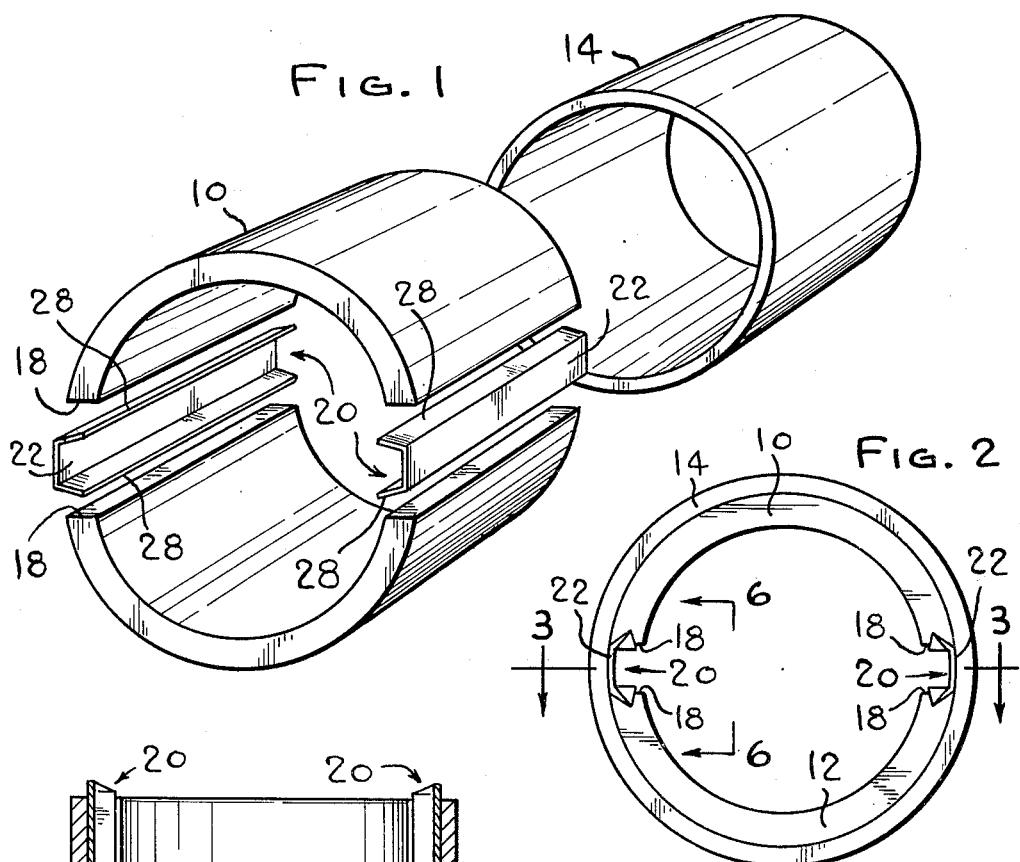
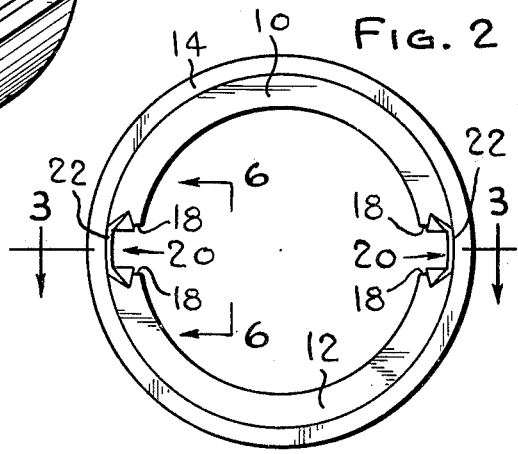
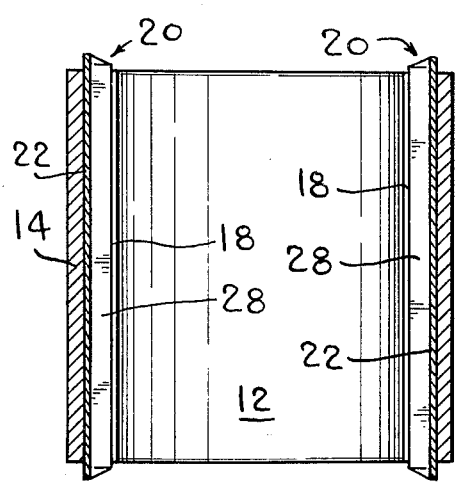
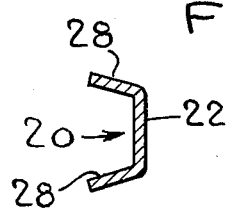
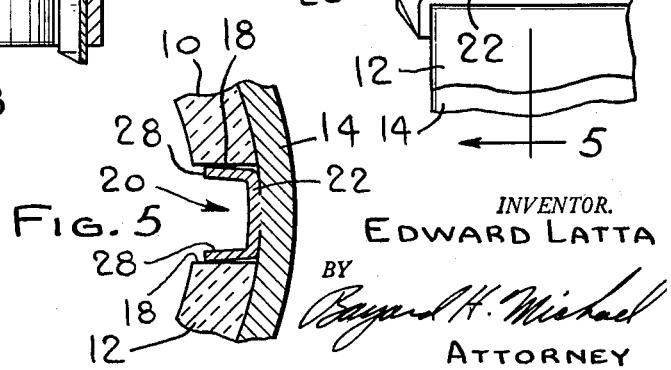
INVENTOR.
EDWARD LATTA
BY
ATTORNEY United States Patent Office 3,091,713
Patented May 28, 1963

3,091,713
CERAMIC MAGNET MOUNTING STRUCTURE
Edward Latta, Owosso, Mich., assignor to Controls Company of America, Schiller Park, Ill., a corporation of Delaware
Filed Sept. 24, 1959, Ser. No. 841,978
3 Claims. (Cl. 310—154)

This invention relates to structure used to mount ceramic magnets in the tubular field shell of a motor. Ceramic (iron ferrites) permanent magnets offer attractive features for use as pole pieces in electric motors, but require new approaches to magnet mounting.

The object of this invention is to provide a simple, inexpensive way to mount semi-tubular ceramic magnets in a tubular motor field shell.

This object is accomplished by forming the magnets into semi-tubes an outside radius substantially equal to the inside radius of the tubular field shell in which they are to be mounted. When the magnets are mounted in the field shell there are gaps between them into which channels can be wedged to hold the magnets in place against the shell. The flat bottom of each channel fits adjacent the shell wall for spot welding or riveting to the wall and the channel sides are compressed between the magnets which forces the magnets against the shell wall. U-shaped members can be used in place of the flat bottomed channels. The channels or U-shaped members are longer than the magnets so that their ends can be swedged over the magnet ends to prevent the magnets from shifting longitudinally in the field shell.

Other objects and advantages will be pointed out in, or be apparent from, the following specification and claims, in which:

FIG. 1 is an exploded perspective view showing the tubular ceramic magnets and the channels that fit between them and also the tubular field shell into which the magnets fit;

FIG. 2 is an end view of the shell and magnet assembly;

FIG. 3 is a sectional view taken on line 3—3 in FIG. 2;

FIG. 4 is an enlarged sectional view of an unmounted channel;

FIG. 5 is an enlarged end view of a mounted channel taken on line 5—5 in FIG. 6;

FIG. 6 is an enlarged side view of a channel end swedged over the ends of the magnets taken on line 6—6 in FIG. 2.

Referring to the drawings, ceramic magnets 10 and 12 are semi-tubes or tubular segments which have an outside radius substantially equivalent to the inside radius of tubular field shell 14. These magnets are sized so that when inserted in the shell there are gaps between the longitudinal edges 18 of the magnets into which metal channels 20 are forced. Each channel has a flat bottom 22 and a pair of sides 28 which are inclined outwardly from the bottom of the channel. The channel is sized so that when it is forced between the longitudinal edges of the magnets the sides are slightly compressed and the bottom of the channel lies adjacent the inner wall of the field shell. Compressing the sides of the channel forces the magnets into contact with the shell wall. Locating the bottom of the channel adjacent the shell wall permits spot welding, as shown in FIG. 5, or riveting of the channel to the steel shell to hold it in place between the magnets. The channel is longer than the magnets so that its ends 26 may be swedged over the magnets to prevent longitudinal movement of the magnets with respect to the field shell.

Although but one embodiment of the present invention has been illustrated and described, it will be apparent to those skilled in the art that various changes and modifications may be made therein without departing from the spirit of the invention or from the scope of the appended claims.

I claim:

1. Magnet mounting structure comprising, a tubular field shell, a plurality of thin tubular segment magnets each having an outside radius substantially equal to the inside radius of the field shell wall, each longitudinal edge on each magnet being substantially parallel to and spaced from a longitudinal edge of another magnet, and expansive channel means mounted in the space between the magnets, said channel members having side members compressed between the longitudinal edges of said magnets to exert a force on the magnets of a greater magnitude at the radially inner surface of the edge than at the radially outer surface of the edge of the magnet.

2. A mounting structure for the permanent magnets of an electric motor comprising, a tubular field shell, a pair of thin segment magnets positioned within said shell and having an outside radius substantially equal to the inside radius of the field shell, each longitudinal edge of each magnet being spaced from and parallel to the edge of an adjacent magnet, and channel means in the spaces between the longitudinal edges of said magnets, said channel means having a base and side members normally diverging from said base, said side members being compressed between said edges thereby imparting a force against said magnet sufficient to prevent it from moving within said shell.

3. A mounting structure according to claim 2 wherein the ends of said side members project beyond the ends of the longitudinal edges of said magnets and are bent outward with respect to the channel member to prevent longitudinal motion of the magnets in the shell.

References Cited in the file of this patent

UNITED STATES PATENTS

| 1,611,942 | Persons | Dec. 28, 1926 |
| 2,045,729 | Ruppe | June 30, 1936 |
| 2,535,004 | Willits | Dec. 19, 1950 |
| 2,819,514 | Pollard | Jan. 14, 1958 |
| 2,894,156 | Kent | July 7, 1959 |
| 2,971,107 | Jin | Feb. 7, 1961 |

FOREIGN PATENTS

| 229,947 | Switzerland | Mar. 1, 1944 |
| 1,038,171 | Germany | Sept. 4, 1958 |